Figure 1:
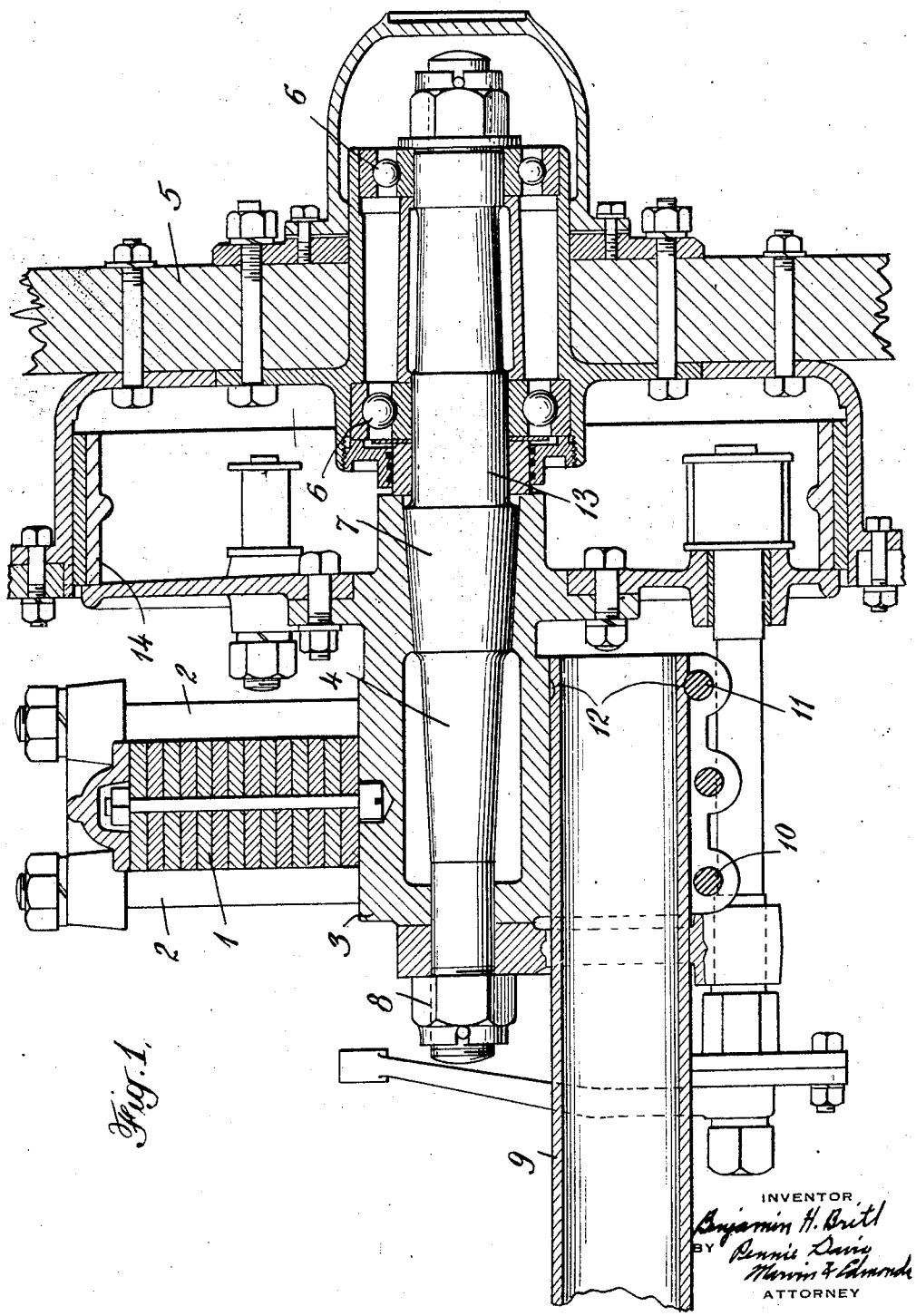

March 6, 1928.  1,661,815
B. H. BRITT
AXLE CONSTRUCTION
Filed Feb. 20, 1925   2 Sheets-Sheet 1

INVENTOR
Benjamin H. Britt
BY
ATTORNEY

March 6, 1928.
B. H. BRITT
1,661,815
AXLE CONSTRUCTION
Filed Feb. 20, 1925
2 Sheets-Sheet 2
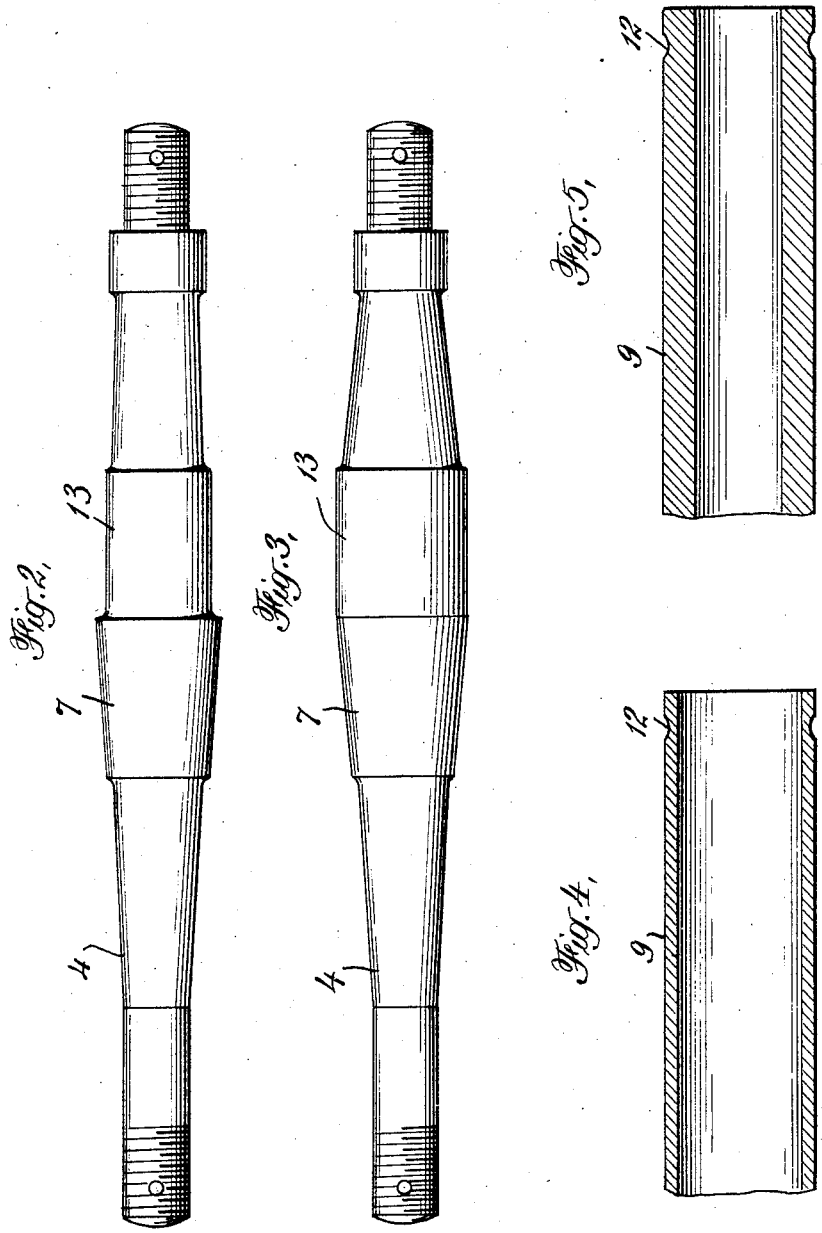

Patented Mar. 6, 1928.

1,661,815

UNITED STATES PATENT OFFICE.

BENJAMIN H. BRITT, OF BRONX, NEW YORK, ASSIGNOR, BY MESNE ASSIGNMENTS, TO COMMERCIAL TRUCK COMPANY, OF PHILADELPHIA, PENNSYLVANIA, A CORPORATION OF PENNSYLVANIA.

AXLE CONSTRUCTION.

Application filed February 20, 1925. Serial No. 10,525.

The present invention relates to vehicle construction and has to do particularly with a rear axle structure for road vehicles, such as motor trucks and the like.

Motor trucks of the type at present widely used for road haulage, and particularly electrically driven trucks of the kind commonly used for local city delivery work, employ a chain drive consisting of a pair of chains driven from a suitable shaft mounted on the vehicle and operating over sprockets provided on the respective rear wheels. Chain driven vehicles of this type usually employ a stationary or dead axle and the wheels rotate on the axle. This is in contrast to the type of construction commonly employed where the driving power is transmitted through a differential gearing, in which case the axles are driven from the differential and the wheels are fixedly mounted on the axles.

In order to withstand the rigorous conditions to which it is subjected during service a dead axle of this type must be of high grade steel. The requisite size of the axle is determined by that portion which is subjected to the maximum stresses, and in the ordinary construction where the axle is continuous and runs through from one wheel to the other that portion occurs at the ends of the axle. For manufacturing reasons, however, such axles are commonly made in the form of a straight rod of uniform cross-section throughout. It is thus necessary that the entire unit be made of very high grade steel and that the entire unit be subjected to a suitable heat treatment in order to give the axle the required properties. This results in a high cost unit which, if bent or broken, is expensive to replace. The strength of the axle is commonly the limiting factor in determining the capacity of the vehicle, and consequently the loading of the vehicle must at all times be limited to the load which can be safely carried by the axle without injury.

It is a principal object of the invention to provide a dead rear axle construction for chain drive road vehicles, such as trucks and the like, of such nature that the capacity of the vehicle may readily be changed by a simple substitution of the axle parts. To this end the structure which constitutes the axle element consists of several parts instead of a single as is usually employed. One of these is a stationary short stub shaft upon which the wheel is mounted to rotate. The stub shaft and the support which secures the shaft to the vehicle are constructed in such fashion that different sized stub shafts can be accommodated, with the result that different carrying capacities of the vehicle are attained by merely introducing the proper size of said shaft. The main axle is a tubular member, and to increase the carrying capacity of the vehicle a tubular member having correspondingly thicker walls may be substituted. Thus, so long as you stay within the factor or safety of the chassis the rated capacity of the vehicle may be increased by merely substituting a new tubular axle and a new stub shaft, which substitutions may conveniently be made in a short time with the result that the vehicle capacity is increased with substantially no increase in vehicle weight. In this way a given vehicle body and chassis may be used for different capacity ratings within reasonable limits without any substantial change in construction.

It is also an object of the invention to provide an axle construction of the class described which may be manufactured at a cost entirely comparable with the cost of present commonly used axle constructions and wherein replacement due to bending or other injury may be made at a minimum of expense. The several parts of the axle construction are each made of that material which is best fitted to the purposes to be served by it. For instance, the stub shaft is a small element and is made of high grade tempered steel. The tubular axle, on the other hand, may be made of low grade steel and at a correspondingly low cost. In this fashion the cost of the entire construction is minimized and the cost of replacement and repair is greatly reduced over that incurred in the types of axle construction heretofore proposed.

It is a still further object to provide an axle construction of this type wherein the respective parts of the unit are protected from excessive stresses. For instance, the tubular axle is so mounted that it is relieved of severe twisting strains during service. Likewise the reaction from the rear wheel brakes of the vehicle is caused to pass directly to the vehicle body, the axle and stub shaft being saved from such stresses.

The accompanying drawings illustrate a preferred embodiment of the invention. In said drawings Figure 1 is a vertical sectional view taken centrally through the axle structure of the vehicle; Figure 2 is a view illustrating the shaft employed in the vehicle corresponding to one capacity rating; Figure 3 is a similar view illustrating the shaft employed in the same axle construction for a higher vehicle capacity rating and Figures 4 and 5 illustrate the respective types of tubular axle employed for different capacity ratings corresponding to the shafts of Figures 2 and 3.

Referring to the drawings, 1 indicates the vehicle spring secured by means of suitable clamping bolts 2 to the member 3 which constitutes a portion of the axle construction. The member 3 is shaped to receive a stub shaft 4 which carries at its outer end the wheel 5 mounted for rotation on the stub shaft 4 thru the medium of suitable bearings 6, and driven by chains engaging with the sprocket-members 5ᵃ. The stub shaft 4 is provided with a tapered portion 7 which fits into a correspondingly tapered portion of the member 3 as shown. The shaft may be drawn up tightly against the member 3 by means of the nut 8 provided at its inner end. The main axle of the vehicle is a tubular member 9 which is secured in the member 3 by means of clamping bolts 10. The axle 9 extends across the width of the vehicle and is secured, by bolts 10, at its ends in the respective members 3 provided adjacent the two rear wheels of the vehicle. In addition to the two fastening bolts 10 a third bolt 11 is provided to fit within an annular groove 12 provided near the end of the tubular axle. The engagement of this bolt in the groove 12 serves to lock the tubular axle 9 against longitudinal movement. The tubular axle 9 may be made of relatively low grade material for the reason that not taking the chain pull it is not subjected to excessively great stresses. The stub shaft 4 receives the maximum stresses since it furnishes the direct connection between the wheel and the body of the vehicle and takes the chain pull.

The stub shaft 4 is subjected to the most serious stresses arising during operation of the vehicle, and this shaft must be made of high grade tempered steel. The shaft is a small unit, however, and may easily be removed by merely loosening its retaining nut 8. In case of damage to the stub shaft 4, such as bending or the like, it is cheaper to replace the part than to straighten it. This feature of the construction is particularly important in that it minimizes the cost of replacement and repair.

In Figures 2 to 5, two sizes of stub shaft 4 and two sizes of tubular axle 9 are illustrated. The stub shaft of Figure 2 is the same as that which is shown embodied in the apparatus of Figure 1 and represents, for instance, the axle which is employed in a truck having a rated capacity of one ton. If it is desired to increase the truck capacity to say two tons, the shaft of Figure 3 is substituted in the retaining part 3 in place of the shaft of Figure 2. The shaft of Figure 3 is heavier and stronger at certain portions in order that it may adequately withstand the additional stresses encountered in a heavier vehicle. The shank portion 13 of the one ton shaft is considerably smaller than that of the two ton shaft. The tapered portion 7 of the two shafts are however, identical, with the result that the shafts are interchangeable in the retaining portion 3.

Figures 4 and 5 illustrate the comparison between the tubular axle employed in a one ton truck and that employed in a two ton truck. The additional capacity is secured by merely incorporating more metal into the walls of the tubular axle so that the member will have the requisite increased strength. The outside diameter of the axle remains the same and the different axles are therefore interchangable. This method of providing for trucks of different carrying capacity is based on the fact that, within certain limits, the frame and body of trucks of different capacities are identical or are but slightly different. The range of carrying capacities which can be accommodated in this fashion is of course limited. That is, it is not possible to convert a one ton truck to a five ton truck in this fashion due to the fact that the frame of the vehicle is not sufficiently strong, but it is possible to convert a one ton truck into a two ton truck in this fashion. The increase in capacity rating is obtained by a simple inexpensive alteration of the vehicle which requires but little time and does not substantially increase the weight of the vehicle.

In case the axle of the vehicle is broken or bent, it is merely necessary to remove the old axle and insert a new tubular member 9. It may be noted that, due to the engagement of the bolt 11 in the groove 12 provided at the end of the tubular axle 9, the axle is permitted a slight rotational or rocking movement around its central axis with the result that it is not subjected to violent twisting stresses during operation of the vehicle. The axle 9 and shaft 4 are further protected from excessive stresses due to the fact that the brake band 14 is connected directly to the shaft supporting part 3 which in turn is connected to the body of the truck.

With this arrangement the forces of reaction arising during braking of the vehicle are transmitted directly to the vehicle body and are not transmitted to the shaft 4 or to the axle 9.

The invention therefore contemplates an axle construction for motor trucks or like vehicles which consists of several parts each formed of the proper material to accomplish its required function, with the result that an efficient yet relatively inexpensive construction is obtained which is particularly effective in facilitating replacement and repair and in reducing the expense of such work. The shaft and axle parts for trucks of different capacities throughout a limited range are interchangeable so that the permissible capacity of the vehicle may readily be changed at small expense.

I claim:

1. In a vehicle of the class described, a member rigidly secured to the vehicle spring suspension and having at least two recesses, a stub shaft removably secured in one of said recesses and extending from one side of said member to receive a vehicle wheel, and a non-driven axle removably secured in another of said recesses and extending from the other side of said member.

2. In a vehicle of the class described, a tubular axle detachably connected at each end to a supporting member and prevented by a transversely extending member engaging with an annular groove at said ends from longitudinal movement, said member permitting rotative movement of said axle sufficient to relieve the axle from stresses caused by torque.

In testimony whereof I affix my signature.

BENJAMIN H. BRITT.